Feb. 1, 1938.　　　　　E. H. DREHER　　　　　2,107,030
COMBINED TABULATING AND PUNCHING MECHANISM
Filed June 14, 1934　　　　9 Sheets-Sheet 1

Elmer H. Dreher
INVENTOR

BY W. A. Sparks
his ATTORNEY

Feb. 1, 1938. E. H. DREHER 2,107,030
COMBINED TABULATING AND PUNCHING MECHANISM
Filed June 14, 1934   9 Sheets-Sheet 3

Fig. 12

Feb. 1, 1938.                      E. H. DREHER                      2,107,030
                  COMBINED TABULATING AND PUNCHING MECHANISM
                       Filed June 14, 1934          9 Sheets-Sheet 6

Fig. 13

Elmer H. Dreher, Inventor
by H. A. Sparks
his Attorney

Fig. 14

Feb. 1, 1938.　　　　　E. H. DREHER　　　　　2,107,030
COMBINED TABULATING AND PUNCHING MECHANISM
Filed June 14, 1934　　　　9 Sheets-Sheet 8

Elmer H. Dreher Inventor
by H. A. Sparks
His Attorney

Patented Feb. 1, 1938

2,107,030

UNITED STATES PATENT OFFICE 2,107,030

COMBINED TABULATING AND PUNCHING MECHANISM

Elmer H. Dreher, Brooklyn, N. Y., assignor to Remington Rand Inc., Buffalo, N. Y., a corporation of Delaware Application June 14, 1934, Serial No. 730,549

17 Claims. (Cl. 164—112)

This invention relates generally to punches and particularly to tabulator controlled summary punches.

This invention is applied to a summary card punch mechanism of the type disclosed in the patent to Kuhlmann and Becker 1,998,281 issued April 16, 1935. This patent discloses a punch mechanism controlled by a tabulator through the medium of an intermediate translator basket or unit.

This present invention provides a manually operable keyboard member adapted to replace the translator unit to permit manual operation of the punch independently of the tabulator. A manual keyboard of the type employed in the present invention is shown in the patent to W. W. Lasker, No. 2,091,409, issued August 24, 1937.

The invention resides in the provision of a novel adapter which enables a translator unit or units or a manually operable keyboard to be interchangeably associated with the punch mechanism of the type employed in a tabulator controlled summary punch whereby the punch may be employed either as a tabulator controlled summary punch or as a manually controlled punch apart from the tabulator. In addition, means are provided whereby the electrical operating circuit for the tabulator and punch may be interrupted and other operating circuits, either for the punch alone or the tabulator alone, may be completed when it is desired either to operate the punch independently of the tabulator or the tabulator independently of the punch.

The change made consists of the removal of the translator unit from the summary punch mechanism and the substitution therefor, of a manually operable keyboard mechanism. This substitution is facilitated by the use of a special adapter employed as a means for guiding to and securing in place the manually operable keyboard.

The principal object of the invention is to operate a punch of the type employed in a tabulator controlled summary punch either by automatic setting from a tabulator, or by manual setting through a keyboard mechanism.

Another object of the invention is to combine components of an automatic summary punch mechanism and a manually operable keyboard mechanism.

Still another object of the invention is to insert a manually operable keyboard mechanism into a partially dismembered summary punch mechanism.

A further object of the invention is to render a partially dismembered summary punch mechanism usable as a manually operable punch mechanism.

Another object of the invention is to convert a summary punch mechanism into a manually operable punch mechanism.

Another object of the invention is to obtain ready interchangeability from automatic to manual operation of a punch mechanism.

Another object of the invention is to obtain ready interchangeability from manual to automatic operation of a punch mechanism.

Another object of the invention is the achievement of interchangeability, in a punch mechanism, of manually operable keyboard mechanisms adapted to control the punch in accordance with different codes.

Another object of the invention is to make use of a novel adapting device for the installation of a manually operable keyboard in a punch mechanism.

A still further object is to save the expense incidental to maintaining a separate card punching unit in addition to a summary punch unit.

Other objects and structural details of the invention will be apparent from the following description, when read in connection with the appended claims and with the accompanying drawings, wherein:

The tabulator mechanism, or tabulator, as herein designated, is designed to convert information, represented by uniformly proportioned perforations in uniformly proportioned cards or record strips, into a printed tabular record.

A tabulator of the type employed with a summary punch is shown at 1, (Fig. 1) and embodies the necessary auxiliary mechanism designed to control the operation of a summary card punch mechanism. This tabulator is of the well known Powers type to which has been added the mechanism, disclosed in the above mentioned Patent 1,998,281, issued on April 16, 1935 to Kuhlman and Becker, for controlling the summary punch. Earlier examples of the Powers tabulator are disclosed in the following patents: Powers 1,245,502, issued on November 6, 1917; 1,236,481, issued on August 14, 1917; 1,245,506, issued on November 6, 1917, and Lasker 1,376,555, issued on May 3, 1921.

The tabulator mechanism, as previously stated, controls the summary punch through a translator unit. This unit is variably actuated in accordance with the totals taken on the tabulator and in turn controls the setting of the punch as in Kuhlman et al. 1,998,281 which utilizes the translator of Merkle 1,884,072 slightly modified in dimensions to give the proper spacing of the translator wires. The punch employed is identical in construction and operation with the punch disclosed, for example, in Patents 1,307,682, 1,684,546 and 1,311,566.

The mechanism of a suitable tabulator controlled summary punch is described in detail in the patents above mentioned. For such detailed description, reference is therefore made to these patents. In the present application, only that part of the structure and operation of the tabulator and summary punch which is necessary to afford an understanding of the present invention, will be described.

Figure 1:
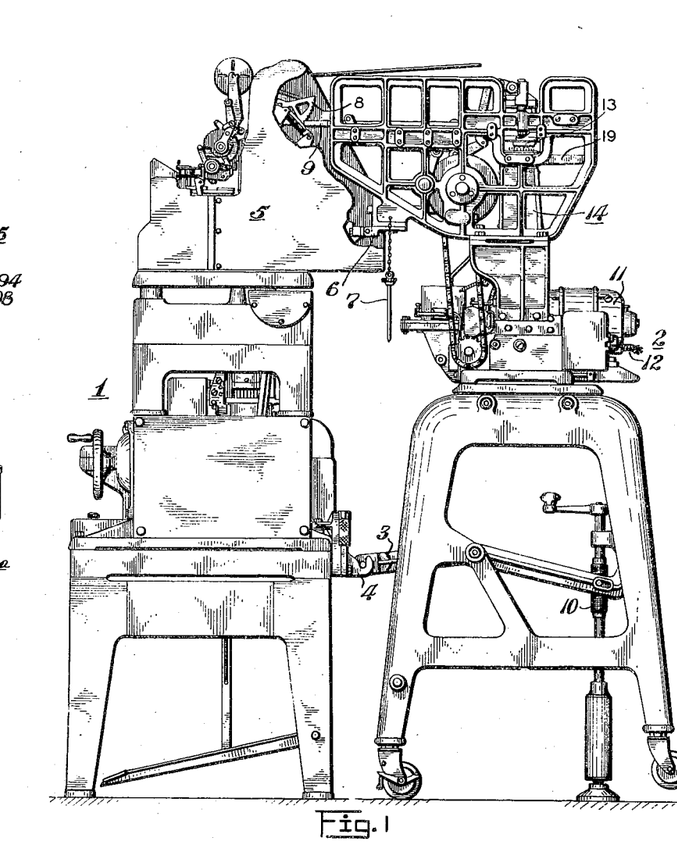
Fig. 1 is a right-hand side view, in elevation, of a summary punch mechanism in operative engagement with a tabulator mechanism. The tabulator rear head cover is shown partially broken away to reveal that portion of the tabulator mechanism especially devised for, and associated with the summary punch operating mechanism.
Figure 2:
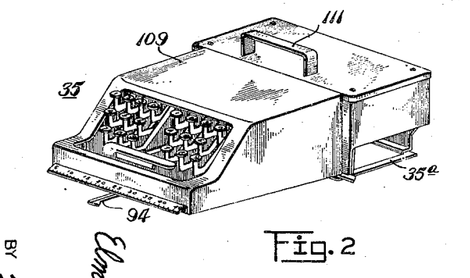
Fig. 2 is an isometric view of a suitable type of keyboard mechanism.

Referring now to Fig. 1, there is shown a tabulator 1 and a summary punch 2. When a tabulator and punch are combined, as shown in this figure, so that the punch is adapted to produce cards carrying the totals taken on the tabulator, the punch is termed a summary punch.

To combine the tabulator and punch, means are provided for connecting the head of the tabulator with the upper part of the punch frame, and the base of the tabulator frame with the lower part of the punch frame. The punch is provided with a pivoted arm 3 carrying a pin which is engaged by a hook 4 on the tabulator. The head frame 5 of the tabulator is provided with two arms (not shown) with each of which an arm 6 on the punch frame cooperates, while pins 7 are provided which may be placed in openings in each pair of cooperating arms when the tabulator and punch are disposed at the proper distance from one another. The stepped storing sectors 8 in the head of the tabulator are arranged to cooperate individually with the selector slides 9, carried by the punch, whenever the tabulator and punch are combined. It is additionally necessary, therefore, to bring the storing sectors and selector slides in proper alignment with respect to one another. This is effected by a screw jack 10 suitably secured to the lower punch frame which is capable of lifting one end of the punch until the storing sectors and selector slides are brought into proper alignment.

The tabulator and the punch are each provided with a motor 11 (only that on the punch being shown). These motors are connected in series when the translator and punch are combined by plugging a three-way cord connection 12 from the punch motor into a three-way receptacle located at the rear of the tabulator (not shown), thereby placing both motors in parallel and this arrangement is connected in series with the switches of the tabulator and punch. Both switches must therefore be closed to permit operation of both the tabulator and punch, and the opening of either switch, if the punch is in operation, will cause both machines to stop. Thus, both machines may be controlled by the tabulator switch.

When it is desired to operate the tabulator independently of the punch, it is necessary to insert a "dummy" plug into the plug receptacle used for connecting the tabulator motor to that of the punch. This plug is wired to complete the electric circuit from the tabulator switch to the tabulator motor, thereby permitting the motor to be controlled solely by this switch. The punch is driven by its motor through a one revolution clutch of the type shown in Patent No. 1,810,317, which is controlled from the total shaft of the tabulator (not shown) in the manner clearly shown in Patent No. 1,998,281. Whenever a total is taken on the tabulator, the punch is accordingly driven through a single cycle sufficient to perforate a summary card according to the set-up of the punch.

Whenever a total is taken on the tabulator, the stepped storing sectors 8 are individually set in the various positions necessary to transfer to the punch the digits of the totals taken in any of the tabulator printing units. In the punch, shown by way of example, totals may be taken in seven different printing units. As there are ten type sectors (not shown) in each of these units and ten digits on each type sector, it is necessary to have these storing sectors 8 in each group, each having ten steps. Thus, the ten storing sectors in each of the seven groups wherein totals are taken are individually set to transfer the digits of the total from an associated printing unit to the punching mechanism. Individually associated with the storing sectors 8 are selector slides 9, both previously mentioned. Each selector slide carries an interponent 13. After the storing sectors in the various groups are positioned, the selector slides are moved to the left by springs (not shown) until the movement of each slide is arrested by the tooth on the corresponding storing sector which is positioned in its path. This variable movement of the selector slides causes the actuation of the translator unit 14 in a manner which will be described later.

Figures 7, 8, 9, 10:
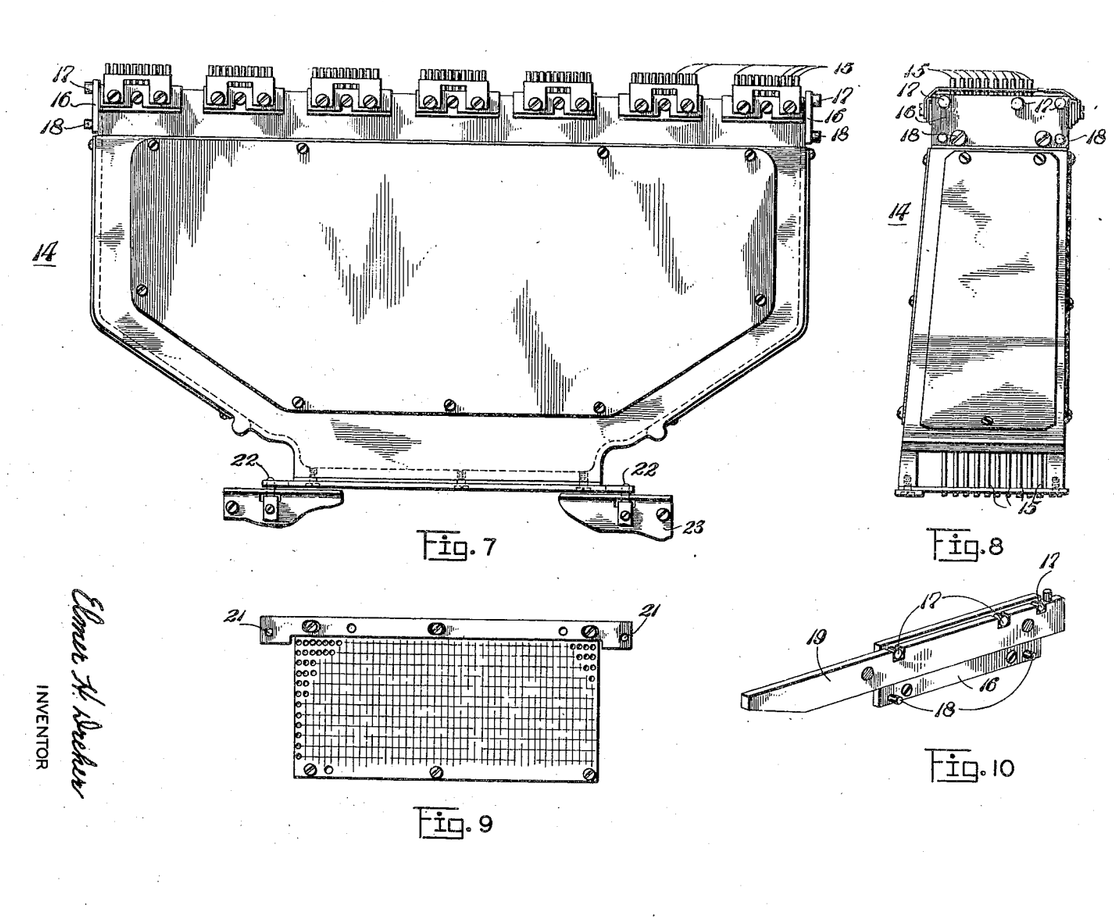
Fig. 7 is a view, in rear elevation, of a translator, of the type applicable to summary punch construction, shown in its doweled or guide pin relationship to a fragmentarily disclosed set bar basket.
Fig. 8 is a view, in left-hand side elevation, of the translator shown in Fig. 7.
Fig. 9 is a bottom view, of the bottom guide plate, of the translator, showing translator locating strip in place.
Fig. 10 is an isometric view of the left-hand translator locating plate shown in engagement with the left-hand frame guide strip.

The translator unit 14 is of substantially the same construction as that ordinarily employed in the Powers tabulator and comprises a box-shaped frame in which connecting wires (see Figs. 7 and 8) are guided for vertical displacement. The ordinary Powers translator unit has been slightly modified, however, in accordance with the manner described in U. S. Patent 1,998,281. Plates 16 are attached to the end walls of the translator box near the top thereof and each plate is provided with three projecting upper studs 17 and two lower studs 18, as shown in Figs. 7, 8 and 10. Horizontal guiding rails 19 are attached to the inner face of the upper punch frame 20. These guiding rails serve, as may be seen from the figures just mentioned and also Figs. 1 and 3, to facilitate the insertion of the translator unit, in that the latter is guided by its studs 17 and 18 thereon as it is being moved to its operative position, whereupon the studs 18 engage suitable recesses provided in the upper face of the guide rails 19. The bottom plate of the translator box is provided with holes 21 adapted to be engaged by studs 22 (see also Fig. 4) projecting upwardly from the intermediate punch frame 23, which contains the punch setting gags 24, when the translator unit or box 14, pushed forward along the guide rails 19, arrives in its proper position. In this manner, the accurate position of the translator unit relative to the other elements of the device is secured without interference with the easy removal or replacement of the translator unit. It is to be observed that the translator unit 14 moves downwardly into operative position, while the motion transmitting wires 15 (Figs. 1 and 7) are held in their raised position, in operative relation with the interponents 13, by the spring pressed punch gags 24.

When the selector slides 9 have been variably moved in accordance with the digits of the several totals to be transferred to the punch 2, the interponents 13 carried by the selector slides are brought into position above predetermined translator wires 15. The interponents 13 are then depressed to lower these translator wires. The depression of these wires then depresses the corresponding punch gags 24, (Fig. 11) and the depressed punch gags are locked in their lowered position by locking slides 25 in a manner well known in the art and as described in combination with Fig. 3 of Patent No. 1,305,557, issued to Powers on June 3, 1919. It is possible, of course, to disable any desired locking slides in the manner disclosed in the Lasker Patent 2,091,409, thus preventing the punching of a total taken in any selected printing unit, or units of the tabulator.

The punching means positioned below and adapted to be set up by the translator unit are identical in operation and construction, as previously stated, to the well known Powers punch, a specific form of which is disclosed, for instance, in U. S. Patents Nos. 1,307,682, 1,684,546, and 1,311,566. The means for causing the punch to operate through a single cycle whenever a total is taken on the tabulator is disclosed in Patent No. 1,998,281. A detailed description of the punch itself, the associated card feeding means, and the control means for initiating the operation of the punch for a single cycle whenever a total is taken, is accordingly deemed unnecessary. It may be mentioned, however, that whenever the punch is driven through a single cycle, a card is fed by the feed rolls 25 into a card chamber formed by two perforated plates attached to the lower punch frame 26. Subsequently, this frame is lifted to press the cards against the punches 27, one punch being provided for each index point on the cards, and those punches which are kept depressed by punch gags 24 punch holes in the cards while the remaining punches are lifted by the card. Then the frame 26 is lowered and the punched total or summary card is seized by the rear pair of feed rolls 25 and fed into a receiving magazine (not shown).

From the foregoing description, it will appear that there is no fixed connection provided between the elements mounted on the upper punch frame 20 and the elements carried by the tabulator head frame 5. The punching attachment may, therefore, be readily removed from association with the tabulator.

(*Figs. 2–7 and 11–18*)

There are occasions when a saving in expense may be effected by the substitution of a component which will render the summary punch unit (indicated by 2 in Fig. 1) usable as an ordinary punch. Such an arrangement eliminates the expense of a separate punch unit.

Figure 3:
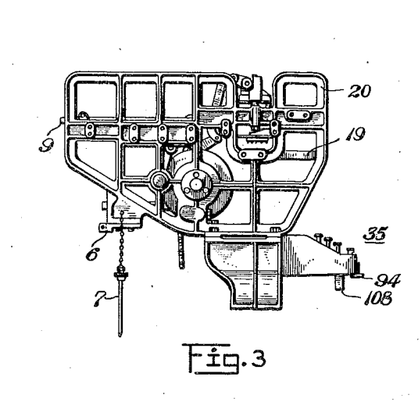
Fig. 3 is a fragmentary view, in right-hand side elevation, of a summary punch mechanism, revealing a portion of a complete, usuable keyboard mechanism inserted in the summary punch mechanism in the space alternatively occupied by the connection basket or translator unit.
Figure 4:
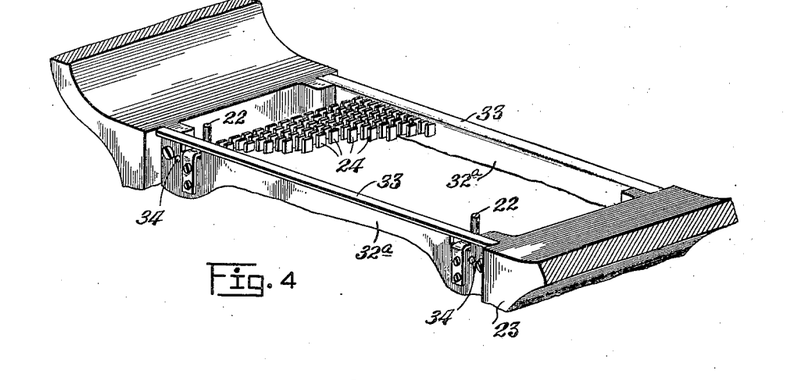
Fig. 4 is a fragmentary isometric view of a summary punch set bar basket.
Figure 11:
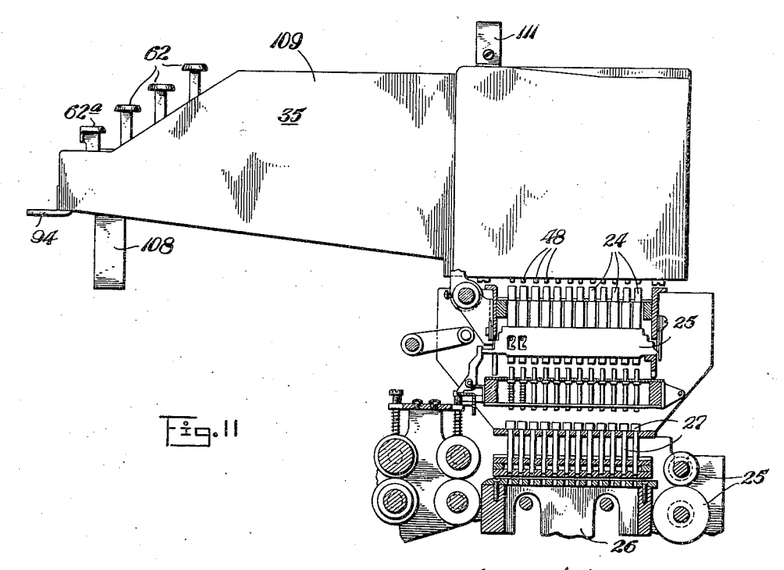
Fig. 11 is a view, in left-hand side elevation, of the keyboard, together with a characteristic section through the set bar basket, punch mechanism, and a fragment of the card feed mechanism. The keyboard adapter is omitted.

The conversion of the summary punch mechanism into a manually operable card punch is effected by removing the pins 7 and unhooking the arm 3 from the hook 4, thus permitting the tabulator and punch to be disassociated from one another, then removing the translator unit 14 and replacing it by a manually operable keyboard (Figs. 3 and 11). The replacement of the translator unit by the manually operable key board 35 is made possible by a novel adapter 28, shown clearly in Fig. 5, which positions the key board in proper relation to the punch gags 24. The adapter comprises a frame 29 carrying two guide bars 30. At the rear of the frame 29 are two depending arms each having a tapped hole in which a set screw 32 is positioned, and near the front end of each guide bar 30 is secured a depending bracket having a tapped hole in which a set screw 31 is positioned. To enable the adapter to be placed on the intermediate punch frame 23 in proper relation to the punch gags 24, each of the guide bars 30 is provided with an untapped hole into which the studs 22 (see Fig. 4), supported by the frame plate 32a, extend. Each of the frame plates 32a is provided with a flanged surface 33 on which the adapter is supported. The four set screws 31 and 32 secure the adapter in position on the intermediate punch frame 23, the front pair of set screws entering holes 34 in the front plate 32a, and the rear pair of set screws frictionally engaging the rear plate 32a. The adapter, with the key board attached to it, can be secured in place, but it is more convenient to secure the adapter in place first and then to attach the key board to it. The means for attaching the key board to the adapter will be described later.

The mechanism of a manually operable keyboard, applied to the operation of, and constituting a component of, a card punching mechanism, or unit, can be varied in construction, dependent upon the functional requirements, and the choice or selection of mechanical motions and actuating means thereof.

In the description to follow, a manually operable keyboard adapted to cooperate with a punch to perforate cards according to the well known 45 column code will be first described, and a description of a key board adapted to cause an associated punch to perforate cards according to the well known 90 column code will follow.

The keyboard mechanism contains keys which may be manipulated manually to set the punch gags 24 in the punch, thereby causing the latter to produce punched cards on which any desired data is recorded.

The keyboard mechanism is shown as a unit and in detail in Figs. 2, 3, 11, 12, 13, 14, 15, 16, 17 and 18.

Figure 12:
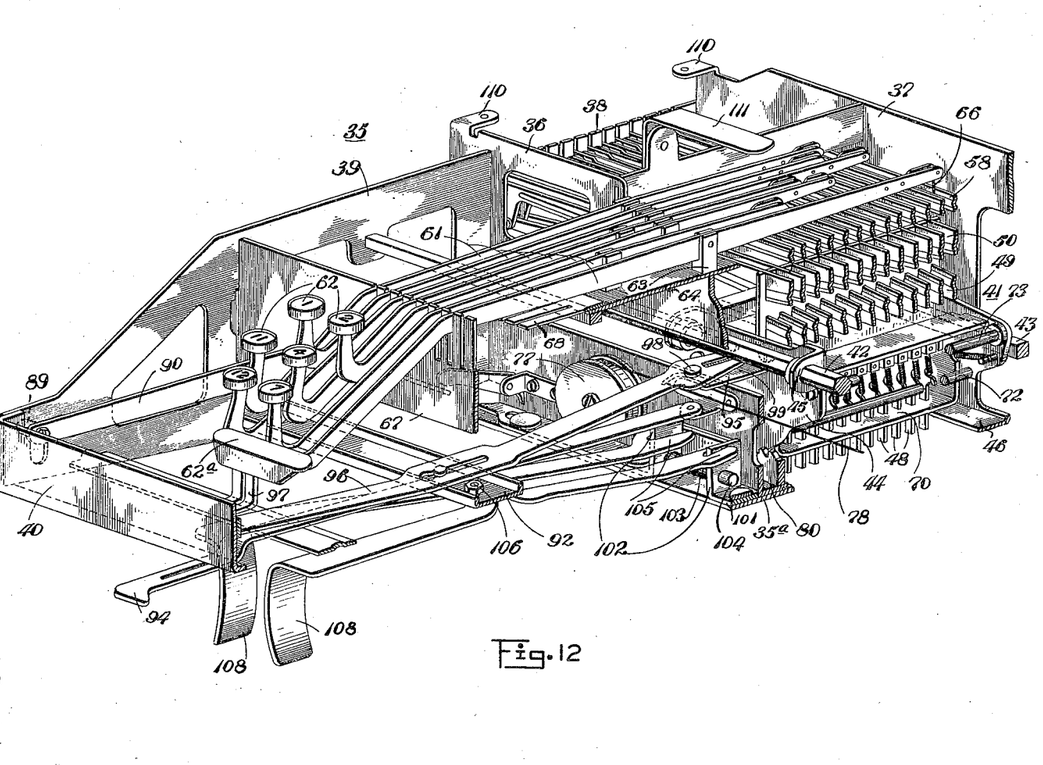
Fig. 12 is a fragmentary, isometric, sectional view of the keyboard mechanism of Fig. 2.
Figure 13:
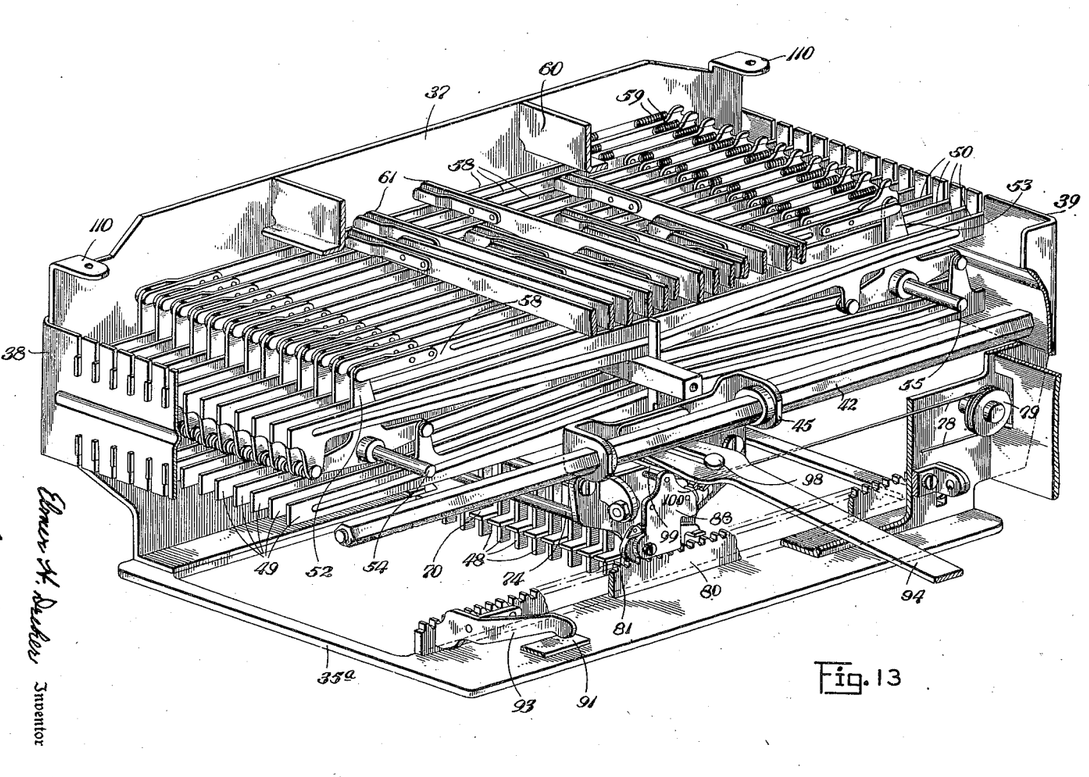
Fig. 13 is a fragmentary, isometric, transverse, sectional view, of the keyboard, showing the escapement mechanism.
Figure 15:
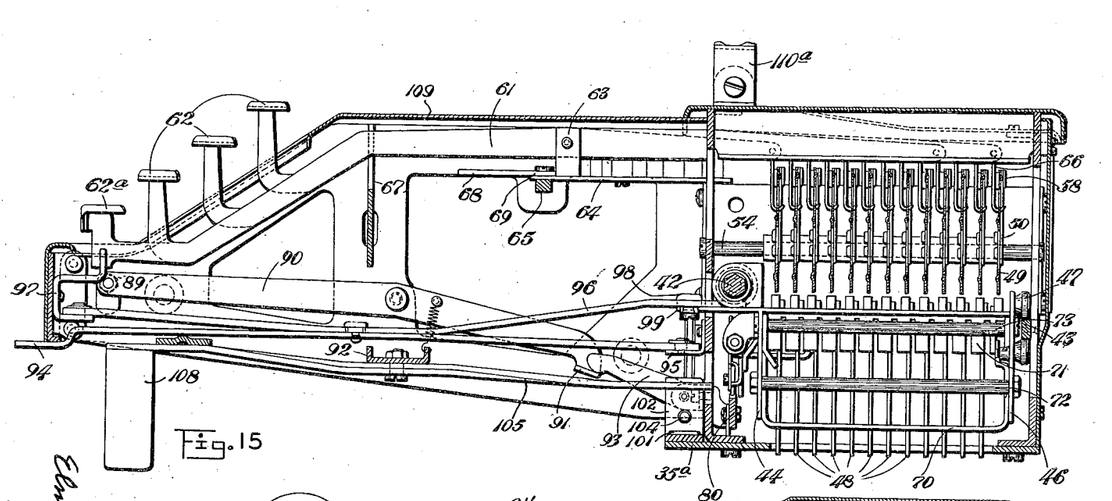
Fig. 15 is a view, in longitudinal section, of the keyboard mechanism.

Referring to Figs. 12, 13 and 15 particularly, it is apparent that the device consists of a rear and a front frame. The rear frame has a bottom plate 35a, a front plate 36, a rear plate 37 and two side plates 38. The front frame has side plates 39 attached to the front plate 36 and a front yoke 40 attached to the side plates 39.

The carriage 41 is adapted to slide on guide rail 42, extending between the side plates 38, and on guide rail 43 attached to the rear plate 37. The front plate 44 of the carriage is provided with two ears 45, extending at right angles to the plate, and the guide rail 42 extends through openings in these ears, as is most clearly shown in Fig. 13. The rear plate 46 of the carriage has two rollers 47 pivoted thereon and these rollers are adapted to slide on the upper and lower edge of the guide rail 43, as is most clearly shown in Fig. 15. The carriage 41 contains a set of depressor bars 48 which cooperate with the punch gags 24 as shown in Fig. 11. The depressor bars are arranged in columns and there are twelve of these bars in each column corresponding to the possible perforations in one column of a 45 column card. The carriage 41 is also provided with an escapement mechanism which will be described later.

Figure 14:
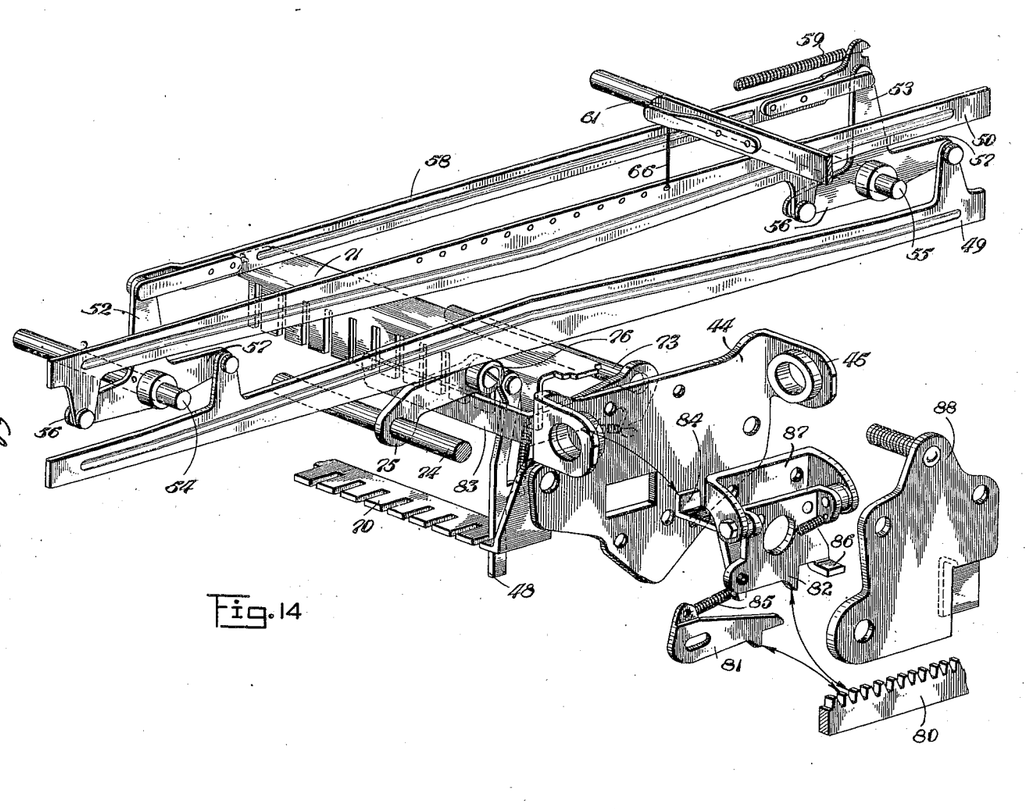
Fig. 14 is a fragmentary, isometric, sectional view of the operating mechanism of the keyboard.

Above the carriage 41 there is provided a series of transverse bars 49 and 50, as shown in Figs. 12 to 15 inclusive, and as particularly shown in Fig. 14. There are thirteen transverse bars in each of the two sets mentioned, one for each of the twelve possible perforations in one column of a 45 column card, and one for the spacing transverse bar. The transverse bars 49 and 50 are guided in slots in the side plates 38 as shown most clearly in Fig. 13, and are supported upon the sets of rocker arms 52 and 53, which, in turn, are carried upon the shafts 54 and 55 as shown in Figs. 13 and 14. The rocker arms 52 and 53, on the shafts 54 and 55, support the weight of the bars 49 and 50, and cause them to move in opposite directions, that is, when 50 is moved up, 49 is moved down. As indicated, the bars 49 and 50 are supported in the side projections 56 and 57. Each pair of rocker arms 52 and 53 is tied together by cross bars 58 which are individually biased toward the left-hand side of the machine, looking from front to rear, by springs 59 tensioned between a tab on one end of each bar and an L shaped plate 60 attached to the rear plate 37 and the front plate 36 of the rear frame, as is particularly shown in Fig. 13. This produces a parallel motion system in which the transverse bars 49 move in opposite directions, that is, whenever a transverse bar 50 is raised, the associated transverse bar 49 is depressed.

Above the cross or tie bars 58 are positioned the key levers 61, as best shown in Figs. 12 and 13. The key levers 61 carry the key tablets 62 at their front end, as shown, and are journaled on pivot members 63. The pivot members 63 are mounted upon the plate member 64 as particularly shown in Figs. 12 and 15, which is supported on the front plate 36 and on a bar 65 attached to the side plates 38. The tails of the key levers 61 are respectively tied to the appropriate transverse bars 50 by the tie wires 66, as is best shown in Figs. 12 and 14. The front ends of the key levers 61 are guided in a comb plate 67, extending between the plates 39. The downward movement of the keys is limited by the stops 68 on comb plate 69 secured to the plate 64 and their upward movement is limited by the length of the slots in the side plates 38 of the rear frame.

The carriage 41, as previously stated, is provided with a front plate 44 and a back plate 46 as shown. The front and rear plate members are connected by a bottom comb plate 70 and a top comb plate 71. Tie rod members 72, 73 and 74 provide further strength and stiffness to the carriage structure.

As shown in Fig. 11, the depressor bars 48 cooperate with the gags or set bars 24. Referring to Fig. 14, the depressor bars 48 are shown attached to auxiliary swinging lever members 75 journaled on the tie bar 74. The members 75 respectively carry at their free ends anti-friction rollers 76, which are respectively adapted to cooperate with the transverse bars 49 in any position of the carriage 41. Thus, any one of the 12 depressor bars 48 can be depressed to set a punch gag 24 by movement of the corresponding transverse bar 49 under the operation of the appropriate key, without regard to the position of the carriage.

The carriage is propelled by a spring and pulley member 77, particularly shown in Fig. 12, which is attached to the front plate 36. From the member 77 the cords 78 is led over a pulley 79 (Fig. 13), which is secured to the front plate 36 and is attached to the carriage 41.

The escapement mechanism consists of a rack bar 80 cooperating with a pawl 81 as shown in Figs. 13 and 14, and a swinging member 82 under the control of a bail member 83, which is actuated each time a depressor bar 48 and its auxiliary swinging lever 75 is actuated to disengage the pawl 81 from the rack 80. The bail member 83 is pivoted on tie rod 73.

A lever 84 is attached by the rivet shown to the top of the swinging member 82 and it enters through the hole in the front plate member 44 of the carriage to cooperate with the bottom edge of the bail member 83 as indicated.

The pawl 81 is slidably mounted on the swinging member 82 by means of a pin and slot connection and is adapted to slide lengthwise with respect to the pin when urged by a spring 85 tensioned between the pawl and the swinging member. The right-hand end of the pawl 81 (as shown in Figs. 13 and 14) is secured upon the shelf portion 86 of the swinging member 82 as indicated. The shelf portion 86 thus limits the downward movement of the pawl 81. The bracket 87, carrying the swinging member 82, is attached to the front plate 44 of the carriage in any suitable manner as by rivets or screws. The escapement mechanism is shielded by a guide plate 88 which also is supported on a front plate 44 of the carriage.

A skip key 89 is provided as shown in Figs. 12, 15, 17 and 18, which consists of a projecting member available from the exterior of the machine which is connected to a lever 90, shown in Figs. 12 and 15. The lever 90 (as shown in Fig. 15) is normally held in the normal position by a spring connected to the lever and to a plate 92 extending between the side plates 39. A plate member 91 carried by the lever 90, serves to actuate a lever 93, which is attached to the escapement rack 80, to depress the rack which is normally disposed above the bottom plate 35a, as is shown in Figs. 12, 13 and 15.

The carriage return mechanism consists of a lever 94 having a front end projecting below and forwardly from the keys 62 and under the front yoke member 40. The lever 94 is pivoted on a bracket 95 attached to the front plate 36 of the rear frame. Disposed above the lever 94 is another lever 96 which returns the carriage 41 to its extreme left-hand position when the lever 94 is moved to its extreme left-hand position. The lever 96 is slidably connected to the lever 94 by a pin and slot connection, and the slot which is in the lever 96, is of sufficient length to follow the movements of the carriage 41. The outer end of the lever 96 is pivoted to a bracket 97, attached to the front yoke 40 and its inner end is bifurcated and encloses a stud 98 positioned in a bracket 99 attached to the front plate 44 of the carriage. To the other side of this bracket, there is attached a slotted plate 100. The cord 78 is knotted at one end and is extended through the slot of the plate where it is held by its knotted end as may be seen from Fig. 12.

Figure 6:
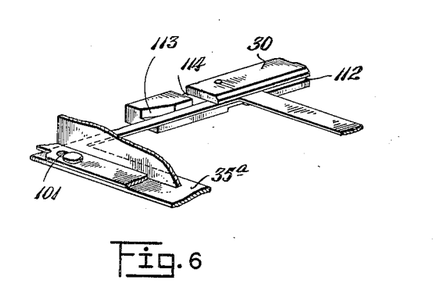
Fig. 6 is a fragmentary isometric view, showing method of engagement, of a keyboard with an adapter.

The bottom plate member 35a is of approximately the same size and contour as the bottom plate of the translator unit 14, shown in Figs. 7, 8 and 9. Latch slides 101, as shown in Figs 6, 12 and 15, are mounted on this plate by a pin and slot connection, and are disposed before the front plate 36. The slides terminate at their inner ends at shoulders 102 which are biased away from each other by a spring 103 and pressed between the shoulders and supported on a bolt 104 which has its opposite ends extending through openings in the slide shoulders. The slides 101 are actuated by tong members 105 as shown, the tong members being pivoted on a bolt 106 carried by the frame cross member 92. The tongs are equipped with finger grips 108 at their front end which are positioned adjacent the front yoke member 40.

A space key 62a is also provided as shown and is connected to another of the key levers 61 and to the rear of the transverse parallel motion bars 51, as is shown in Figs. 12 and 15. This particular transverse bar, as shown in Fig. 15, has no depressor bar 48, but has merely a lever member 75 to actuate the bail 83 (Fig. 14) to give a spacing action to the carriage 41. The space key 62a is guided in its movement by a slot in the upper end of the bracket 97, as is shown in Fig. 12.

The keyboard is provided with a casing 109 (Fig. 15) which encloses it but leaves the keys 62 and 62a, skip key projection 89, the carriage return lever 94 and the tongs 105 exposed. This casing is supported by arms 110 on the front plate 36 and the rear plate 37 of the rear frame and is secured in place by screws extending through openings in the casing and threading into tapped holes in the arms 110, the side plates 39 of the front frame, and the side plates 38 and the rear plates 37 of the rear frame. A handle 111 (Figs. 12 and 15) for carrying the key board is attached to the arms 110a.

Figure 5:
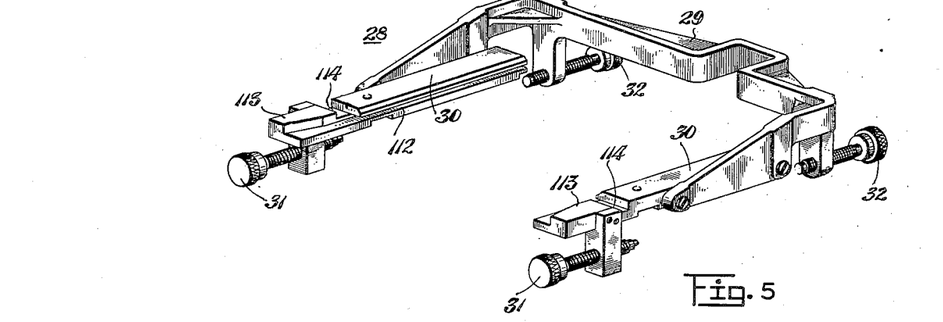
Fig. 5 is an isometric view of the keyboard adapter.

In securing the key board to the adapter, the rear frame is attached to the adapter while the front frame containing the keys extends toward the rear of the punch, as shown in Fig. 5. The key board is associated with the adapter by inserting the opposite sides of the bottom plate 35a in longitudinal grooves 112 in the guide bars 30. The front end 113 of each guide bar 30 is bevelled so that the latching slides 101 of the key board are gradually moved toward one another as the bottom plate 35 of the key board rear frame is moved rearwardly in the longitudinal groove 112. When the key board reaches its proper position in relation to the adapter, the latching slides 101 have reached the transverse grooves 114 in the guide bars 30 and at this time the latching slides are forced into these grooves by the pressure of the spring 103. In this way the key board is locked to the adapter 28 with the depressor bars 48 of the carriage 41 in operative relation to the punch gags 24, as shown in Fig. 11.

To remove the key board from the adapter, the finger grips of the tongs 105 are compressed with the result that the latching slides 101 are removed from the transverse grooves of the guide bars 30. The outer edges of the key board rear frame can then be withdrawn from the longitudinal grooves 112 and the key board moved from the adapter.

In the operation of the invention, the translator unit 14 may be removed from the punch mechanism 2 in the manner described in the above mentioned Patents 2,004,208 and 2,091,409, and replaced by the key board in the manner above described. The carriage 41 may then by brought to the left-hand position by swinging the front end of the carriage return lever 94 to its extreme left-hand position. Any one of the keys 62 may then be depressed according to the digit to be recorded. Depression of a key lifts the tail of the connected key lever 61, thereby pulling upwards on the connecting wire 66 to raise the associated cross bar member 50 and thus depress the transverse bar member 49 through the previously described parallel motion system. The downward movement of the bar 49 depresses the corresponding swinging lever member 75 of the carriage 41, whatever may be the position of the carriage along the rails 42 and 43, and thereby depresses the corresponding depressor bar 48 to depress a punch gag 24, corresponding to the desired digit in the first column, thereby causing it to be locked in its lowered position. Simultaneously, the bail 83, is depressed and the swinging member 82 of the escapement mechanism is swung sidewise. This carries the pawl 81 sidewise off of the rack bar 80 and it is moved forward one tooth by the spring 85 into position to engage with the next rack tooth. At the same time the pawl on the swinging member 82 engages a tooth on the rack bar 80, thus preventing the movement of the carriage. Upon release of the key 62, the key lever 61 returns to its original position, as do the transverse bars 49 and 50, and their associated mechanism, thus raising the members 75 and 48 and the bail 83. This allows the swinging member 82 to return to its original position free of the rack bar 80 and the pawl 81 to re-engage the rack 80 one tooth in advance of its previous position so that the carriage is moved one step along the rack bar 80.

This procedure may be continued to set the desired sequence of set bars in the successive columns of the card. If it is desired to skip a column, the space key 62a may be operated. The operation of this key effects a sequence of operations similar to those just described up to the point of the movement of a depressor bar 48, but as previously stated, no depressor bar is operated by the actuation of the space key. The only function of the space key is to depress the bail member 83 and hence to actuate the escapement mechanism to move the carriage a single stop forward.

Depression of the carriage release or skip key 89 depresses the escapement rack bar 80 and allows the carriage to travel freely toward its extreme right-hand position as long as the skip key is depressed. When the rack bar 80 is depressed, the pawl 81 is prevented from following the rack bar in its downward movement and thus preventing the release of the carriage by the shelf portion 86 of the swinging member 82 (see Fig. 14).

When the desired punch gags 24 thus have been set by the key board, actuation of the punch trip key, (not shown, but of the type used on the well known Powers punch, a specific form of which is disclosed in U. S. Patent No. 1,305,557, issued on June 3, 1919) will cause the punch motor 11 to drive the punch mechanism through a single cycle by means of the one revolution clutch previously mentioned, and cause the card to be automatically punched in accordance with the punch gag set up as is well understood in the art. The punch gags depressed by the key board to effect this punching of the card are raised by the actuating of the locking slides 115 of the punch in the manner well understood in the art and described in detail in the Patent 2,091,409. It is, of course, possible to disable the locking slides 115 and then hold the trip key depressed until any desired number of similar cards are punched.

When the desired cards have been punched, the key board may be removed by the sequence of operations above described. The key board may then be replaced by the desired translating unit 14, the punch re-combined with the tabulator, and the combined tabulator and punch operated together as a tabulator controlled summary punch.

An alternative form of key board differing somewhat in construction from the key board mechanism just described is provided for punching cards in accordance with the 90 column code. This key board may be substituted for a translator basket whenever it is desired to punch cards according to a 90 column code.

Figure 16:
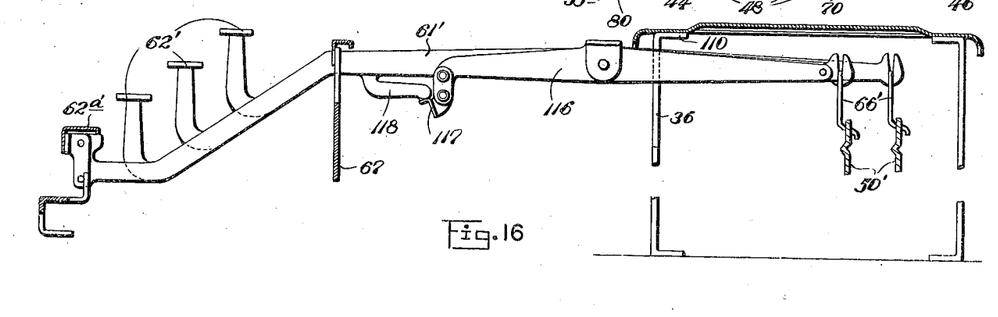
Fig. 16 is a view, in fragmentary, longitudinal, section, of the operating mechanism of an alternative form of keyboard mechanism for use with the 90 column code.
Figure 17:
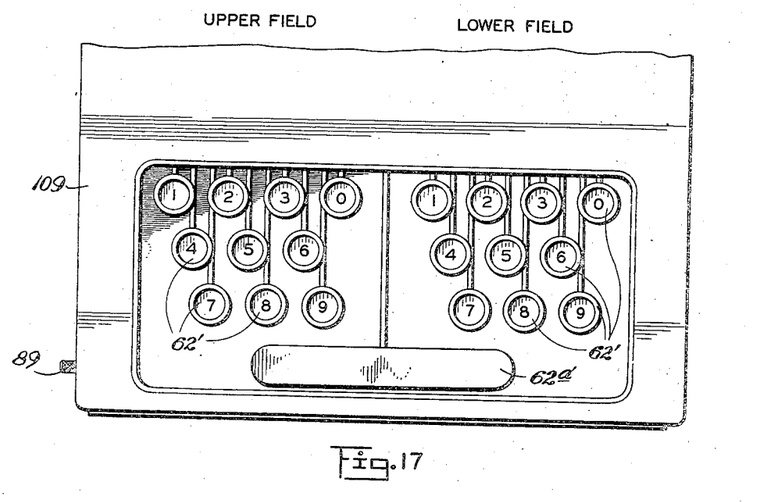
Fig. 17 is a top view of the manipulative elements of a keyboard mechanism for use with the 90 column code.
Figure 18:
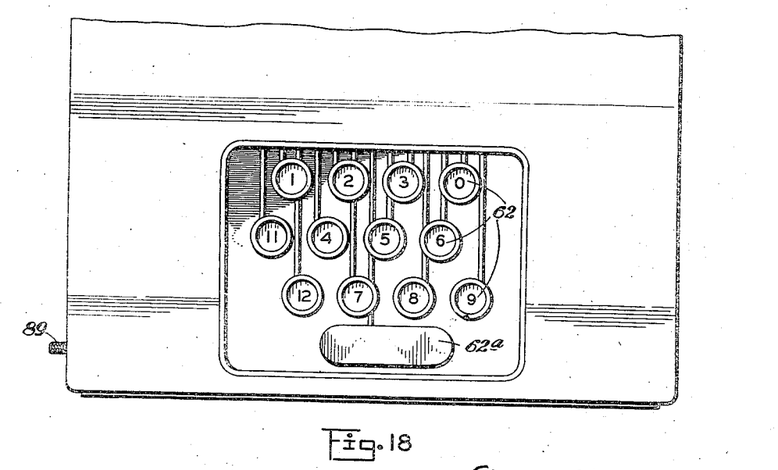
Fig. 18 is a top view of the manipulative elements of a keyboard mechanism for use with the 45 column code.

For this purpose, a key board in general similar to that just described, but having two key boards, one for punching data in the upper field of a card and one for punching data in a lower field, is provided as shown in Fig. 17. To provide these two key boards a double number of digit keys 62' (20 keys) and a single space key 62a' are required. The key levers 61' are similar to key levers 61 in the previously described embodiment as is indicated in Fig. 16 and a similar carriage and escapement mechanism is provided, as well as a similar system of parallel motion bars. The auxiliary lever 116 is provided, as shown in Fig. 16, having a cross bracket member 117 cooperating with auxiliary finger 118 on the key levers of the even numbered keys. Similar tie wires 66' are provided connecting the tails of the key levers 61' to the parallel motion cross bars 50' corresponding to cross bars 50 of Figs. 13 and 14. It will be noted, however that the tie wires 66 shown in Figs. 12 and 14 cooperate with fitted holes in the tails of the key levers 61 whereas those shown in Fig. 16 cooperate with slots in the tails of the key levers 61'. This slot is not provided, however, in the lever 61' connected to the zero, nine and space keys of the 90 column keyboard. As shown, the lever 116 cooperates with the upper field keys and is connected to the seventh from the front of the transverse bars 50' and another similar lever (not shown) cooperates with the lower field keys and is connected to the first from the front of the transverse bars 50'. The zero key, and the odd keys 62' are each connected by a wire 66' to an individual transverse bar 50'. Each even key is connected by a wire 66' to the same transverse bar 50' to which the next lower odd digit key is conected, and as previously stated, is also connected with the nine key through suitable linkage. The previously mentioned slots in the levers 61' permit the wires 66' connected to the even key levers 61' to rise whenever an odd key is depressed and vice versa, thus preventing the depression of the next higher even digit key 62' when an odd digit key is depressed and preventing the depression of the next lower odd digit key 62' whenever an even key is depressed. The nine keys, when depressed, of course do not tend to cause the depression of any other key, since they are connected to a single transverse bar 50', and hence the tail of the nine key lever need not be provided with a slot in which the tie wire 66' rests.

The invention thus consists of a punch adapter which permits either a translator unit or a manually operable key board to be interchangeably associated with a punch of the summary punch type, and the punch thus operated as a tabulator controlled summary punch or a manually controlled punch apart from the tabulator.

The invention further enables the punch when operated as a manually controlled punch to perforate cards according to either 45 or 90 column code.

The invention not only enables the punch to be operated independently of the tabulator, but also enables the tabulator to be operated independently of the punch.

The invention furthermore enables the user of a tabulator controlled summary punch to avoid the expense of a separate punch for punching cards according to either a 45 or 90 column code.

I claim:

1. In combination, a punch mechanism comprising a plurality of punches, a removable translator component containing elements for actuating individual ones of said plurality of punches, and a mechanism interchangeable with said translator component for manual operation of said punch mechanism.

2. In combination, a punch mechanism comprising a plurality of punches, a removable translator element which selects individual punches for operation, and a removable mechanism interchangeable with said translator element for manually operating said punch mechanism.

3. In combination, a punch mechanism for perforating data cards, a removable element which selects punches appropriate to the data to be punched, mechanism for actuating said translator element, and a manually operable mechanism interchangeable with said translator component for manual operation of said punch mechanism.

4. In combination, a punch mechanism having a removable translator component, a manually operable punch setting mechanism, and an adapter for rendering this last named mechanism replaceable for said translator component.

5. In combination, a punch mechanism having a removable translator component operable through associated mechanism, by the mechanism of a tabulator, a manually operable punch setting mechanism, an adapter frame for rendering said translator component interchangeable with said manually operable punch setting mechanism for operating said punch mechanism.

6. In combination, a punch mechanism having a movable translator component for setting punches according to the actuation of an associated operating mechanism, and a manually operable mechanism, which by use of an adapter frame is interchangeable with said translator component for manual operation of said punch mechanism.

7. A punch mechanism having a plurality of interchangeable setting components, one comprising a translator mechanism including a depressor means for the depressing of the punches, adapted to be positioned and controlled by a tabulator mechanism including associated mechanism comprising step sectors, sensing slides, selection plungers and an operating bridge; the other comprising a manually operable mechanism including a key board for manipulation, an escapement device, depressor means and an adapter frame for securing said manually operable mechanism in a position appropriate for depressing said punches, both individually by key manipulation and in columnar position by the action of said escapement.

8. In combination, a tabulator, a punch assembly suitable for cooperation therewith, a translator component for selecting an individual punch from among the punches of said assembly, a device for manually setting individual punches, and an adapter frame for alternatively securing said device in place of said translator component.

9. In combination, a tabulator, a punch mechanism, mechanism which includes a translator element for setting said punch according to totals accumulated on said tabulator, and a device which is alternatively interchangeable with said translator element for manually setting said punch according to data other than data produced in said tabulator.

10. In combination, a tabulator, a punch mechanism normally settable according to totals accumulated on said tabulator and actuatable according to the taking of totals by said tabulator, a manual device for alternatively setting said punch mechanism and rendering said tabulator actuated mechanism ineffective, and an adapter frame for securing said manual device in operable position.

11. In combination, a punch mechanism normally settable according to the action of associated tabulator mechanism, and an insertable device comprising keys and an escapement for manually setting said punch mechanism and rendering the setting by the action of said associated tabulator mechanism ineffective.

12. In an accounting system a punch mechanism and alternatively operable devices for controlling said punch, one thereof comprising a card-controlled tabulator device including a reading storage member, and a removable member cooperating between said storage member and said punch, and the other comprising a keyboard member adapted to control said punch.

13. In an accounting system, a punch mechanism and alternatively operable devices for controlling said punch, one thereof comprising a card-controlled tabulator device including a reading storage member, and a removable member cooperating between said storage member and said punch, and the other comprising a keyboard member adapted to control said punch, said keyboard member including an adapter frame, and an escapement device for causing setting of a plurality of punches from a single keyboard.

14. The combination, with an accounting machine and a punch including a translating unit for controlling the actuation of the punch in accordance with predetermined operations of said accounting machine, of means for operating the punch independently of the accounting machine comprising an adapter, a keyboard controlled mechanism attachable to the adapter, and means for detachably mounting the translating unit in the punch whereby the unit may be removed to prevent control of the punch by the accounting machine, said means also serving to mount the adapter in the punch in such a position that the keyboard controlled mechanism is operatively associated with the punch upon being attached to the adapter.

15. The combination, with an accounting machine including stepped storing sectors settable in accordance with predetermined operations of said accounting machine, a punch including a plurality of gag slides, a plurality of punches, and a translating unit operatively associated with the gag slides for actuating the punches when the gag slides are operatively associated with the storing sectors, of means for operating the punch independently of the accounting machine comprising an adapter, a keyboard controlled mechanism attachable to the adapter, and means for detachably mounting the translating unit in the punch whereby the unit may be removed to prevent control of the punch by the accounting machine, said means also serving to mount the adapter in the punch in such a position that the keyboard controlled mechanism is operatively associated with the punches upon being attached to the adapter.

16. The combination, with a tabulator and a summary punch including a translating unit for controlling the actuation of the punch in accordance with totals taken on the tabulator, of means for operating the punch independently of the tabulator comprising an adapter, a keyboard controlled mechanism attachable to the adapter, and means for detachably mounting the translating unit in the punch whereby the unit may be removed to prevent control of the punch by the tabulator, said means also serving to mount the adapter in the punch in such a position that the keyboard controlled mechanism is operatively associated with the punch upon being attached to the adapter.

17. The combination, with a tabulator including stepped storing sectors settable in accordance with predetermined amounts printed on the tabulator, a summary punch including a plurality of gag slides, a plurality of punches, a translating unit operatively associated with the gag slides for actuating the punches when the gag slides are operatively associated with the storing sectors, of means for operating the punch independently of the tabulator comprising an adapter, a keyboard controlled mechanism attachable to the adapter, and means for detachably mounting the translating unit in the punch whereby the unit may be removed to prevent control of the punch by the tabulator, said means also serving to mount the adapter in the punch in such a position that the keyboard controlled mechanism is operatively associated with the punches upon being attached to the adapter.

ELMER H. DREHER.

CERTIFICATE OF CORRECTION.

February 1, 1938.

Patent No. 2,107,030.

ELMER H. DREHER.

It is hereby certified that error appears in the printed specification of the above numbered patent requiring correction as follows: Page 3, second column, line 52-53, after the word "keyboard" insert the reference numeral "35"; page 4, second column, line 55, for "cords" read cord; page 6, second column, line 63, after the word and period "code." insert the following paragraph:

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed. ;

page 7, first column, lines 8 and 9, for the words "component for manual operation of" read element for manually operating; and that the said Letters Patent should be read with this correction therein that the same may conform to the record of the case in the Patent Office.

Signed and sealed this 30th day of August, A. D. 1938.

Henry Van Arsdale

Acting Commissioner of Patents.

(Seal)